(12) United States Patent
Ong

(10) Patent No.: US 6,508,021 B2
(45) Date of Patent: Jan. 21, 2003

(54) STACKABLE STORAGE UNIT

(76) Inventor: Bon S. Ong, Box 4247, Torrance, CA (US) 90510

( * ) Notice: Subject to any disclaimer, the term of this patent is extended or adjusted under 35 U.S.C. 154(b) by 0 days.

(21) Appl. No.: 09/886,163

(22) Filed: Jun. 22, 2001

(65) Prior Publication Data

US 2002/0092222 A1 Jul. 18, 2002

Related U.S. Application Data

(63) Continuation-in-part of application No. 09/758,497, filed on Jan. 12, 2001, now abandoned.

(51) Int. Cl.$^7$ .............................. A47B 81/06; A47F 5/02
(52) U.S. Cl. .......................... 40/312; 312/9.46; 211/40; 211/163; 40/493; 40/722
(58) Field of Search .......................... 40/503, 506, 493, 40/312, 313, 722; 312/9.45, 9.46, 9.31, 9.7; 206/308.1, 308.3, 387.1, 387.15; 211/40, 49.1, 70, 163, 194; D6/300

(56) References Cited

U.S. PATENT DOCUMENTS

| | | | | |
|---|---|---|---|---|
| 3,692,376 A | * | 9/1972 | McKinsey et al. | 312/9.42 |
| 4,826,261 A | * | 5/1989 | Nademlejnsky | 312/9.42 |
| D364,278 S | * | 11/1995 | Guyton | D6/300 |
| 5,651,595 A | * | 7/1997 | Willis | 312/249.2 |
| D444,177 S | * | 6/2001 | Carretta | D19/85 |

* cited by examiner

Primary Examiner—Cassandra H. Davis
(74) Attorney, Agent, or Firm—Charles H. Thomas

(57) ABSTRACT

Modular storage units are formed for small, household articles so that the units can be stacked vertically one atop another. Each unit is formed with a box supported from beneath by a stand for rotation relative to the stand about a central, vertical axis of rotation. The stand has a base that covers a horizontal stand base area and supports the flat bottom of the box. The top of the box is flat and has a concave, upwardly facing recess at its center that has a shape configured to snugly received the stand of a unit stacked directly above. Any number of modular storage units can be stacked one atop another with the stand of each unit being centered and laterally confined by the stand receiving recess in the top of the box located immediately below. In this way all of the boxes are rotatable independently of each other about a common, vertical axis of rotation. The contents of the boxes may be accessed either by forming the box with an open side, or by forming each top of the box as a removable lid. Preferably, one or more of the side walls of the box are formed as frames having window openings within which pictures are positioned for viewing.

4 Claims, 5 Drawing Sheets

STACKABLE STORAGE UNIT

The present invention is a continuation in part of U.S. application Ser. No. 09/758,497 filed Jan. 12, 2001, now abandoned.

BACKGROUND OF THE INVENTION

1. Field of the Invention

The present invention relates to a modular type of storage device, units of which can be stacked one atop another and rotated relative to each other about a central, vertical axis of rotation.

2. Description of the Prior Art

Various types of boxlike storage units have previously been devised which are capable of being stacked one of top another. Typically such units include some type of interconnection between the bottom of the unit above and the top of the unit below that holds the units in a fixed relationship relative to each other. Such connections sometimes take the form of feet on the bottom of an upper unit that fit into corresponding depressions in the unit beneath. Other connections involve snap locking fasteners that provide a positive engagement between vertically stacked units.

While a fixed engagement between vertically stacked units is sometimes advantageous, in other situations the fixed orientation between the stacked units is undesirable. For example, some embodiments of boxlike storage units are provided with windows in which pictures, such as photographs, drawings, or other visually appealing flat, decorative, sheet-like articles can be mounted on the various walls of the units. However, if the units are stacked in a fixed orientation relative to each other, it is often difficult, if not impossible, to view the pictures displayed on the sides of the boxes.

My prior U.S. application Ser. No. 09/758,497 describes a spinning photo tower in which similar boxlike units, stacked one atop another, can be rotated relative to each other to allow particular photographs or other pictures to be viewed quite easily. However, I have since discovered that this system can be improved in several respects. Specifically, my prior system involves mounting boxlike units upon a central, vertical pole, about which the units can be rotated independently of each other. However, this prior device serves only as a display system, since the upright pole passing through the centers of the boxes precludes the use of the boxes for storage purposes. Also, the units of my prior system cannot be readily detached from each other to easily alter the height of the device. Rather, the height of my prior system is determined by the height of the pole, which is designed to accommodate a specific number of units. No more than the specific number of units for which the pole is designed can be mounted on the pole. Also, if a lesser number of units are mounted on the pole, the top of the pole projects upwardly above the uppermost unit in an unsightly manner.

SUMMARY OF THE INVENTION

It is an object of the present invention to provide modular boxlike units that can be stacked one atop another and which are rotatable relative to each other about a common vertical axis and which are useful both for exhibiting visual displays, such as photographs, and also as storage containers. For example, compact discs can be stored within the units while photographic displays can be exhibited on the sides of the units. Since the units can be rotated relative to each other, it is quite easy to rotate a specific one of the modular units to a desired orientation either to withdraw the contents thereof, or to view pictures, such as photographs, displayed on any sidewall of the unit.

With an arrangement of stackable units that can be rotated relative to each other and independently of each other about a common vertical axis, favorite photographs can be viewed at will merely by spinning or twirling the desired unit to an orientation in which the desired picture is visible. Also, if the units are provided with side openings for withdrawal of their contents, they can be rotated independently of each other to provide easy side access to the storage enclosure between the upright side walls.

Another object of the invention is to provide stackable storage units that can be easily separated from each other. According to the system of the present invention, no elongated, central support structure is required to mount a plurality of modular storage units for rotation relative to each other about a vertical axis. Quite to the contrary, each storage unit includes a stand at its bottom and a top having a concave, upwardly facing cavity or recess to receive the stand of the unit positioned directly vertically above. The stand supports the bottom of each unit with a connection thereto that allows the box-shaped structure to be rotated about a central, vertical axis relative to the stand. However, successive vertically stacked units may be instantly and easily separated from each other merely by lifting an upper unit off of the unit located directly therebeneath.

A further object of the invention is to provide a system for stackable storage units in which any greater or lesser number of a plurality of units may be stacked one atop another. The system of the invention avoids a central elongated structure that is necessary to support all of the units. Instead, each of the storage units is provided with only the minimal mounting structure necessary to detachably couple it to other units directly above and below it. Therefore, there is no limit on the number of units that can be stacked one atop another. Moreover, each unit can be used independently by itself as a single storage device. When used in this manner the boxlike enclosure structure can be rotated about a vertical axis relative to its supporting stand beneath.

In one broad aspect the present invention may be considered to be a modular storage unit comprising a box having upright side walls that define a vertical axis of rotation at their center, a horizontal top closing the upper extremities of the side walls and defining on its upper surface a concave, upwardly facing recess having a stand confining horizontal surface area centered on the vertical axis, a horizontal bottom closing the lower extremities of the side walls, and a stand located beneath and supporting the bottom for rotation relative thereto about the vertical axis. The stand covers a horizontal stand base area that conforms to and fits snugly within the stand confining horizontal surface area.

In a preferred embodiment of the invention the top and the bottom of each unit have a rectangular shape and are equal to each other in area. Both the stand confining horizontal surface area and the stand base area have a round shape that is smaller than and fits within the confines of the rectangular shape of the top and bottom.

Also, modular box storage units according to the invention are preferably constructed with at least one of the side walls being formed as a frame with a window opening therein. A picture may be removably mounted on the inside of the frame for viewing through the window opening. In this manner favorite photographs and other pictures may be displayed on the sides of the box storage unit. Moreover, the box-shaped portion of the unit may be rotated relative to its stand to facilitate selective display of a picture or other article to be viewed on any side of the unit at which the picture is mounted.

In some embodiments of the invention the top is removable from the upper extremities of the side walls. This allows the contents of the box-shaped storage structure to be accessed from above by removing the top, which serves as a lid. Embodiments constructed in this manner allow pictures to be displayed on all of the side walls of the unit.

In another embodiment of the invention the side walls define an access opening therebetween. For example, the top and bottom may have a rectangular shape and there may be three side walls, each having a rectangular perimeter. One side of the box storage unit is an open side through which the contents of the unit may be accessed.

In another broad aspect the invention may be considered to be a stackable storage unit comprising: a box having upright walls, an accessible interior enclosure, and a flat, horizontal top and bottom. The top has a recessed cavity at its center that has a predetermined vertical cavity depth. The cavity extends over a predetermined horizontal cavity floor area. The unit also includes a stand rotatably secured to the bottom of the box by a mounting between the stand and the bottom of the box that permits rotation of the box relative to the stand about a vertical axis of rotation. The vertical axis of rotation passes through the center of the box, the center of the recess cavity, and the center of the stand. The stand covers a stand base surface area that fits snugly within the cavity floor area. The stand supports the box thereabove and has a height at least as great as the predetermined vertical cavity depth.

In still another aspect the invention may be defined as a plurality of modular storage units each comprising: a box having upright walls arranged symmetrically about a vertical axis of rotation, a horizontal top extending across the upper extremities of the upright walls, a horizontal bottom extending across the lower extremities of the upright walls, and a stand located beneath the center of the box bottom. A shallow, concave upwardly facing stand cavity is defined at the center of the top. The stand cavity has a predetermined depth shallower than the thickness of the top. The cavity covers a stand cavity surface area that is centered on the vertical axis of rotation. The stand covers a horizontal stand area that conforms to and fits closely within the stand cavity surface area. The stand supports the box for rotation about its vertical axis and has a height that exceeds the predetermined cavity depth. The boxes are vertically stacked one atop another so that their axes of rotation coincide. Each cavity of all but the uppermost box receives and laterally confines the stand of a box located above it.

The invention may be described with greater clarity and particularity by reference to the accompanying drawings.

DESCRIPTION OF THE EMBODIMENT

Figure 1:
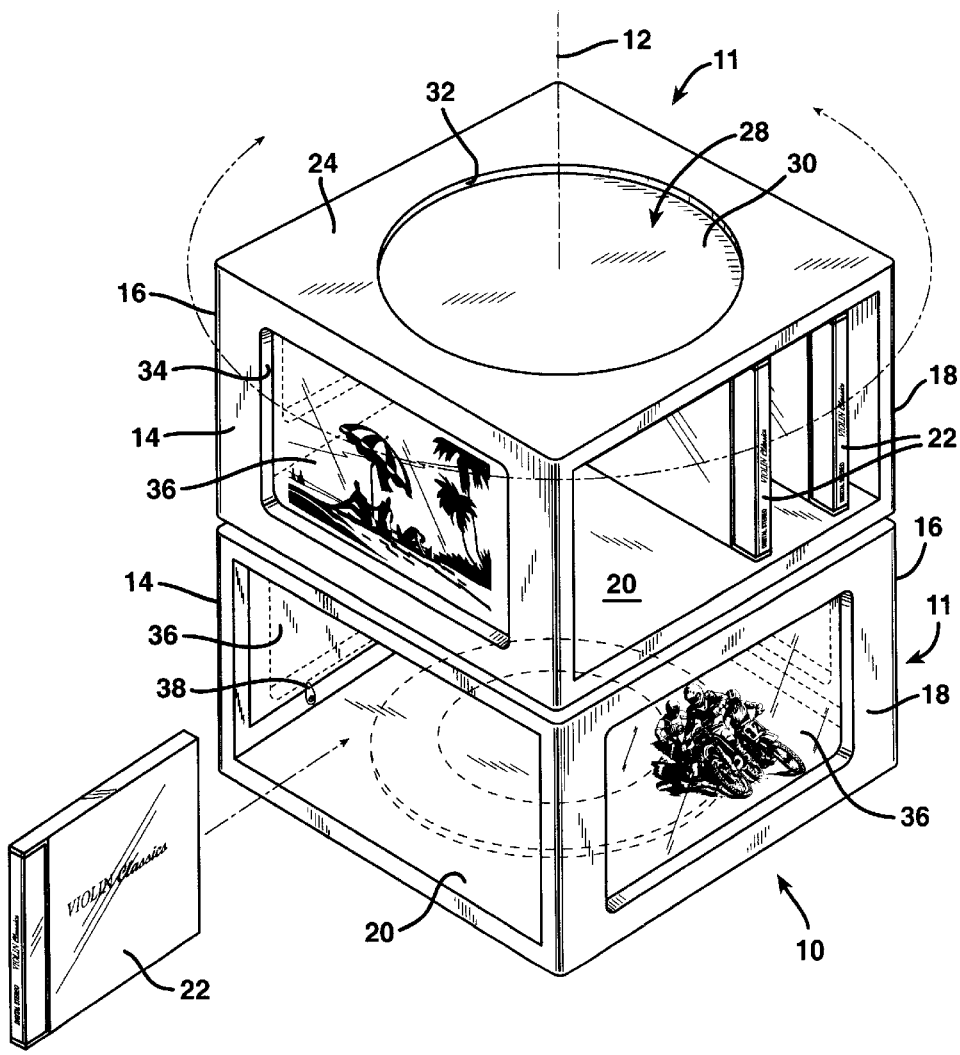
FIG. 1 is a perspective view of a pair of stacked storage units according to one preferred embodiment of the invention.

FIG. 1 illustrates a pair of modular, stackable storage units 10 that are stacked for rotation relative to each other about a common vertical axis 12. Each of the stackable storage units 10 is comprised of a box 11 shaped in the form of a rectangular prism having three rectangular, vertical upright side walls 14, 16, and 18 and an open side indicated at 20 located between the upright side walls 14 and 18 and opposite the sidewall 16. The outside dimensions of the two opposing side walls 14 and 18 may, for example, be six and one-half inches in height and five inches in width. The sidewall 16 may, for example, be six and a half inches in height and six inches in width. The open side 20 provides access to the interior enclosure of each modular unit 10 which provides a storage volume for articles, such as the compact discs in their jewel cases 22 as illustrated.

Figure 2:
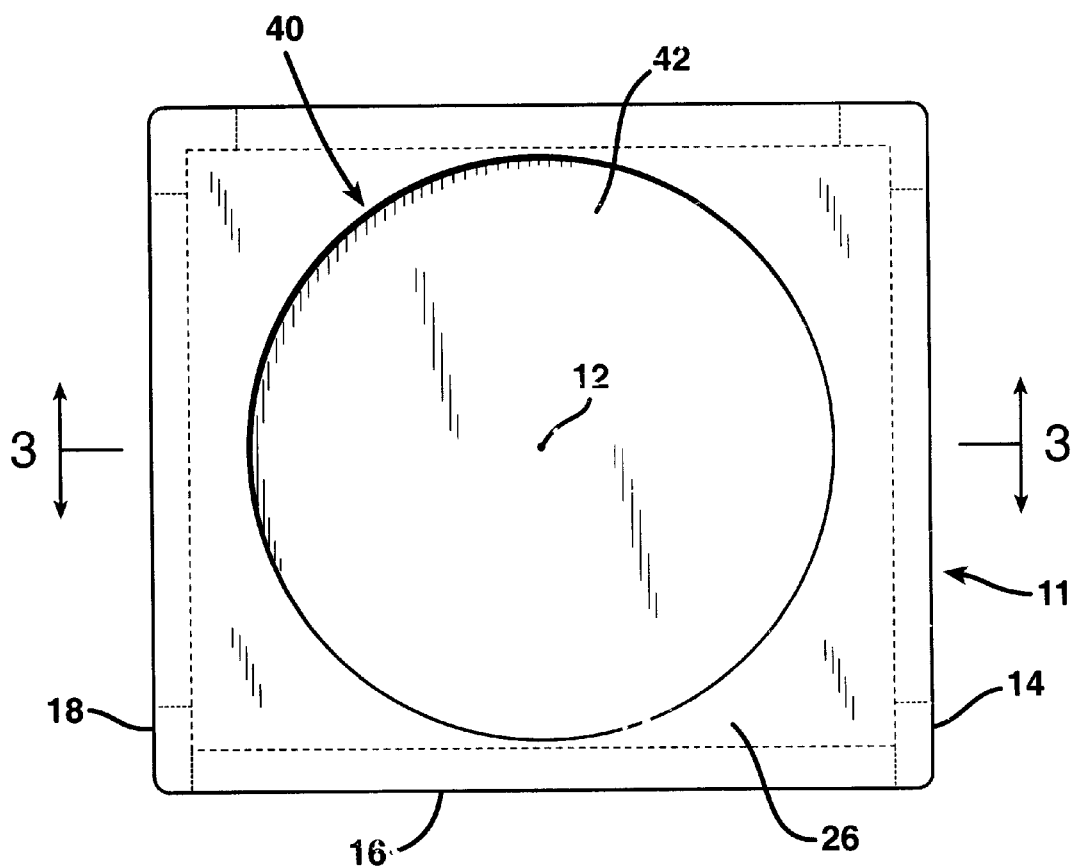
FIG. 2 is a bottom plan view of one of the modular storage units in the pair of storage units shown in FIG. 1.

As illustrated in FIGS. 1 and 2, each of the box storage unit boxes 11 has a rectangular top 24 and a rectangular bottom 26 that are equal in size to each other. For example, both the top 24 and the bottom 26 may have area dimensions of five inches by six inches and a thickness of one-half inch. The flat top 24 extends across and closes the upper extremities of the upright side walls 14, 16, and 18.

As illustrated in FIG. 1, the top 24 has defined on its upper surface a shallow, concave upwardly facing disk-shaped stand cavity recess 28. The stand cavity recess 28 has a flat, horizontal, circular floor 30 located at a predetermined depth beneath the plane of the flat upper surface of the top 24, as determined by the height of a low, confining cylindrical cavity wall 32. The cavity wall 32 extends only partially through the thickness of the top 24 so that the stand cavity 28 has a predetermined depth shallower than the thickness of the top 24. It should be noted that the stand cavity 28 covers a circular, stand cavity surface area defined by the area of the cavity floor 30. The center of the cavity floor 30 lies on the vertical axis of rotation 12. In one preferred embodiment of the invention the round recess 28 has a peripheral diameter of four inches and a depth of one-quarter of an inch.

Figure 3:
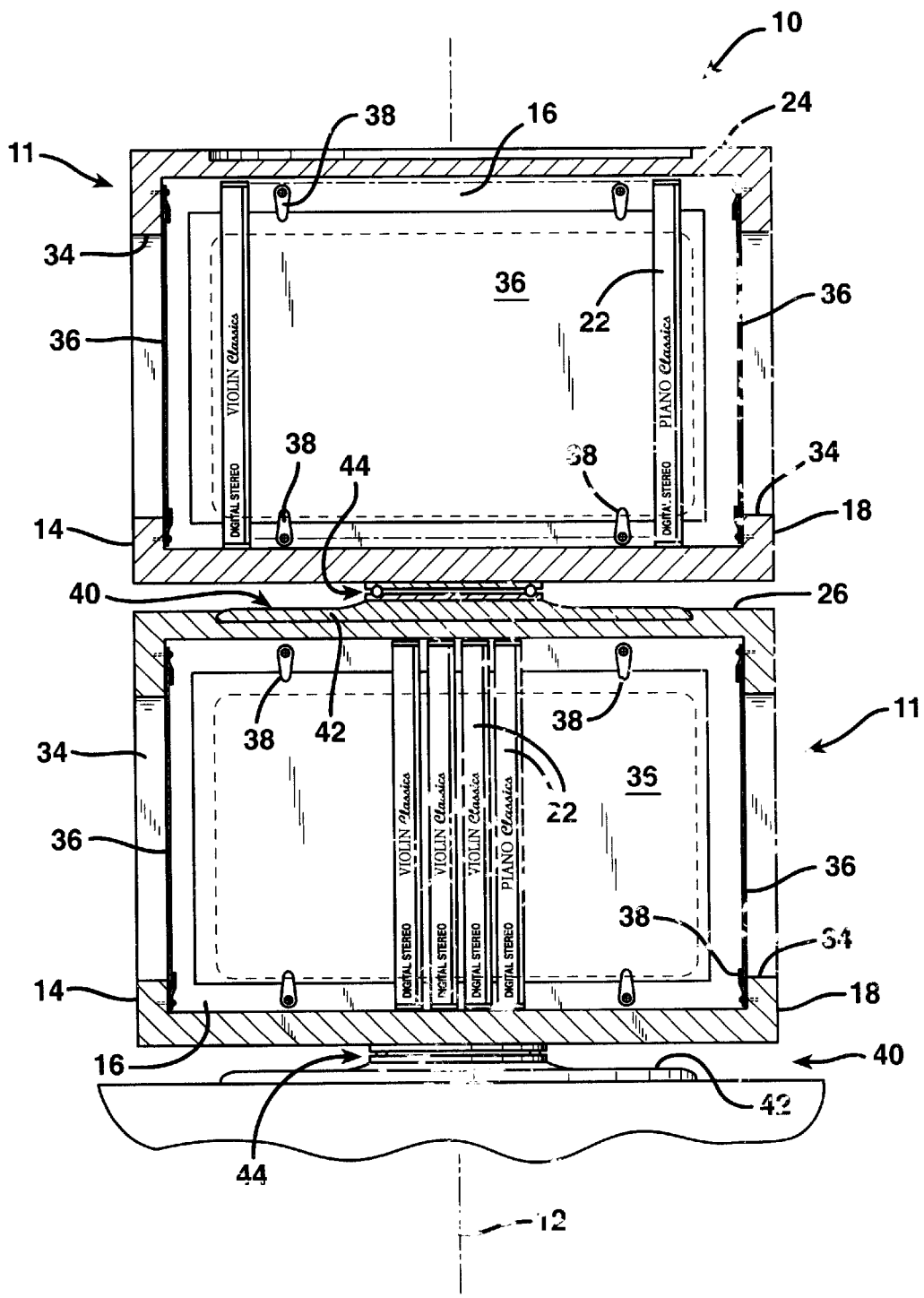
FIG. 3 is a sectional elevational view of the pair of storage units shown in FIG. 1 taken along the lines 3—3 in FIG. 2.

As illustrated in FIGS. 1 and 3, all of the upright side walls 14, 16, and 18 are formed as rectangular frames, each defining a rectangular window opening 34 therein. The window openings 34 allow viewing of pictures 36 mounted in the window openings 34. The pictures 36 may, for example, be photographs printed on flat sheets of photographic paper, with or without glassine windows in front, and removably mounted on the inside surfaces of the frames formed by the side walls 14, 16, and 18. The pictures 36 may be mounted by means of conventional swivel tab photographic mounts 38 which are visible in FIG. 3.

Each of the modular box storage units 10 also includes a stand 40 located beneath and supporting the box bottom 26 for rotation relative thereto about the vertical axis 12. The stand 40 has a generally disk-shaped base 42 that covers a horizontal stand base area that conforms to and fits snugly within the stand confining horizontal surface area defined by the cavity floor 30 in the top 24. In the embodiment illustrated in FIGS. 1–3, the horizontal stand base area of the stand base 42 may, for example, be three and fifteen-sixteenths inches. The stand 40 supports the box 11 formed by the side walls 14, 16, and 18 and the top 24 and bottom 26 for rotation about its central, vertical axis 12 by means of a bearing ring 44, visible in FIG. 3.

Also as illustrated in that drawing figure, the stand 40 supports the box like structure above so that the bottom 26 of the box 11 above is at a height that is at least as great as, and preferably exceeds the predetermined cavity depth defined by the cavity sidewall 32. In the embodiment illustrated in FIGS. 1–3 the stand 40 supports the box 11 of the stackable modular unit 10 of which it is a part so that the underside of the bottom 26 is at a height of three-eighths of an inch above the bottom of the base 42. As a result, there is a slight clearance between the top 24 of the each lower modular unit 10 and the bottom 26 of the unit mounted immediately above. This clearance allows the modular box storage units 10 to be stacked one atop another so that each box 11 may be rotated freely and independently of all other boxes 11 about the common, vertical axis of rotation 12.

Since both the stand base surface area of the stand base 42 and the floor 30 of the cavity 28 have a round shape, and since the diameter of the stand base 42 is just slightly less than the diameter of the floor 30, the stand base 42 fits closely within the confines of the cavity wall 32. As a consequence, each of the modular storage units 10 is centered atop the storage unit 10 located immediately therebeneath, and all of the boxes 11 rotate independently of each other about a single, common vertical axis of rotation 12.

As is evident, each of the modular storage units 10 shown in FIGS. 1–3 may be quickly and easily stacked together with each of the other modular units 10. Specifically, a modular unit 10 to be stacked atop another unit 10 is merely lifted up, centered above the modular unit 10 located immediately therebeneath, and lowered so that the base 42 of the stand 40 rests within the cavity 28 of the top 24 of the storage unit 10 located immediately below. A number of modular storage units 10 can be stacked one atop another in this way.

Each of the boxes 11 of each of the modular storage units 10 is rotatable relative to its stand 40 about the common axis of rotation 12. Different modular units 10 can be added or taken away from the stack, as desired by the user. Since each of the storage boxes 11 can be rotated relative to its own stand 40, each storage box 11 is rotatable independently of each of the other boxes 11 in the stacked array illustrated in FIGS. 1–3.

Figure 4:
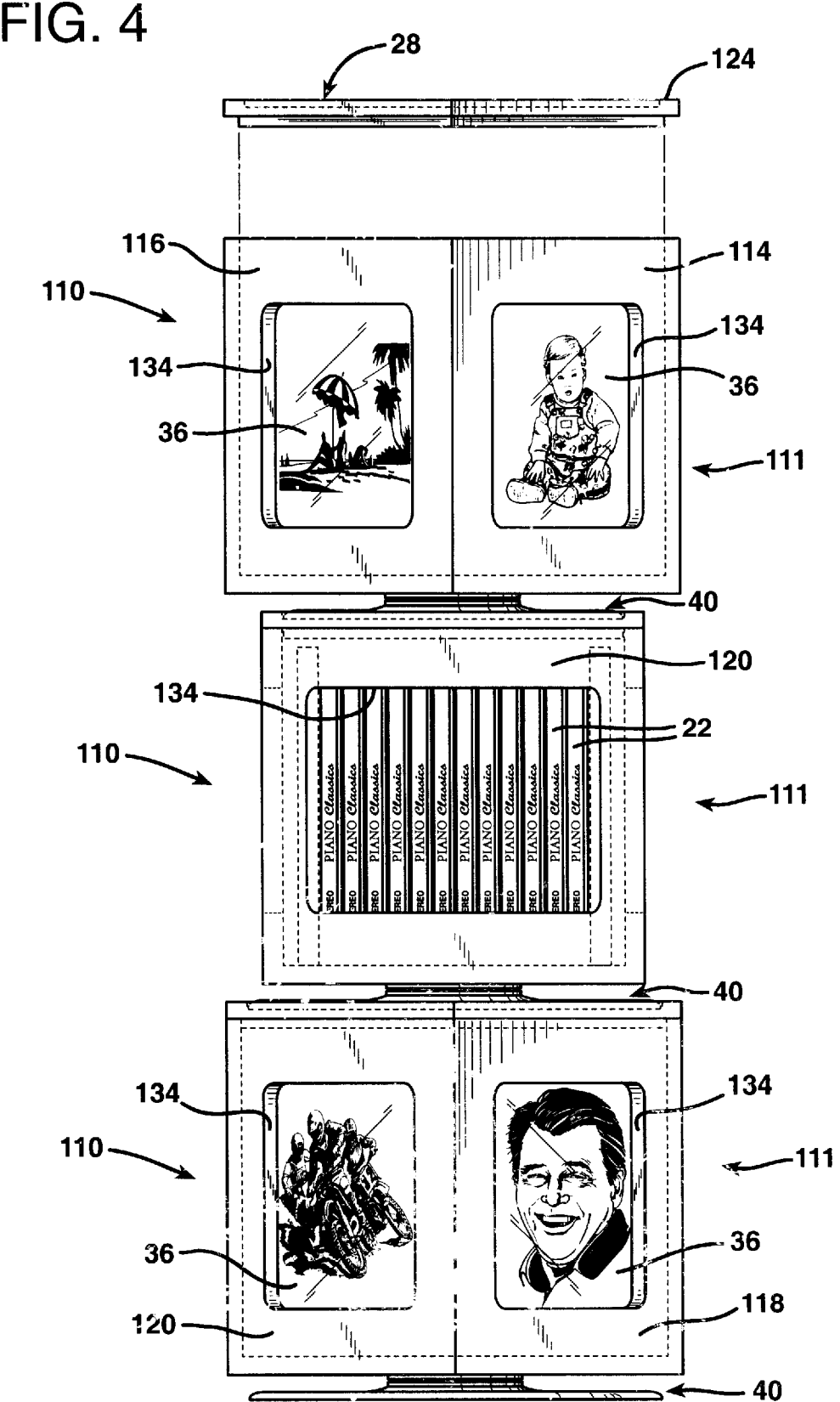
FIG. 4 is an elevational view of an alternative embodiment of a plurality of stackable modular box storage units according to the invention.

FIG. 4 illustrates another embodiment of the invention that employs a plurality of modular storage units 110, each of which is comprised of a box 111 formed by four upright rectangular walls 114, 116, 118, and 120. As illustrated, each of these upright walls defines a rectangular viewing window 134. Photographs 36 are positioned in some of the windows 134, although the window 134 in the side wall 120 is left open so that the titles of the compact discs in their jewel cases 22 can be viewed through the open window.

The modular storage units 110 differ from the modular storage units 10 in that the modular storage units 110 are top opening units. That is, each of the modular units 110 includes a top 124 that is removably seated upon the upper extremities of the upright walls 114, 116, 118, and 120. Thus, the enclosure of the each of the boxes 111 is accessed by removing the lid 124 as illustrated in FIG. 4. The stands 40 and the corresponding cavities defined in the top lids 124 are the same as those described in the embodiment of FIGS. 1–3.

Figure 5:
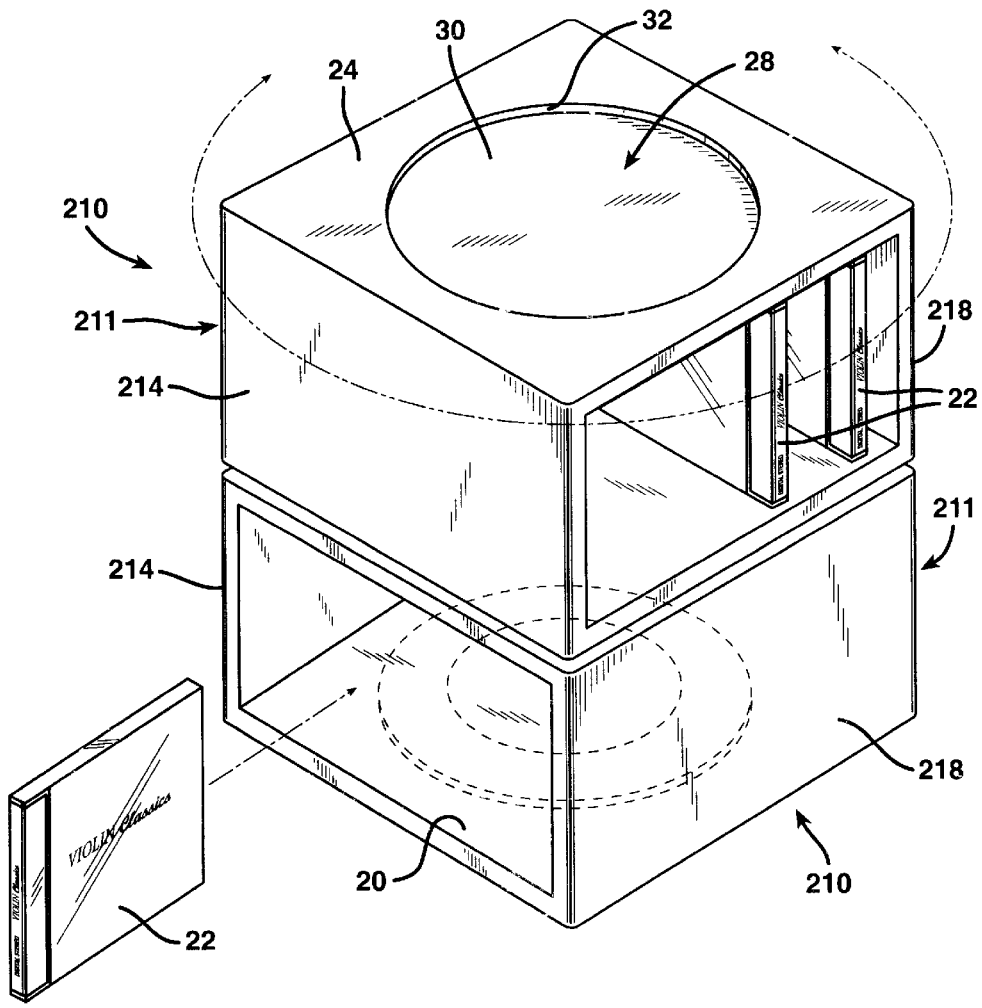
FIG. 5 is a perspective the view of a pair of stackable storage units according to another embodiment the invention.

FIG. 5 illustrates still another embodiment of the invention which employs a plurality of stackable storage units 210 removably stacked one atop the other. Each of the stackable storage units 210 includes a box-shaped structure 211 having three, solid upright rectangular walls 214, 216, and 218, an open side 20, a top 24 and a bottom 26. The open aside 20, the top 24, the bottom 26, and the stands employed in each of the stackable storage units 210 are identical to those described in connection with the embodiment of FIGS. 1–3. The stackable storage units 210 differ from the modular units 10 described in connection with FIGS. 1–3 in that each of the side walls 214, 216, and 218 is a solid, rectangular panel, rather than a surrounding frame with a rectangular window defined therein.

Undoubtedly, numerous variations and modifications of the invention will become readily apparent to those familiar with storage units for small, household items and with photographic displays. Accordingly, the scope of the invention should not be construed as limited to this specific embodiment depicted and described, but rather is defined in the claims appended hereto.

I claim:

1. A modular storage unit comprising a box having upright side walls that define a vertical axis of rotation at their center, a horizontal top closing the upper extremities of said side walls and removable therefrom, and defining on its upper surface a concave, upwardly facing recess having a stand-confining, horizontal surface area centered on said vertical axis, a horizontal, rectangular bottom closing the lower extremities of said side walls, and a stand located beneath and supporting said bottom for rotation relative to said stand about said vertical axis, and said stand covers a horizontal stand base area that conforms to and fits snugly within said stand-confining horizontal surface area of said top.

2. A stackable storage unit comprising: a box having upright walls, an accessible interior enclosure, and a flat, horizontal top and bottom, wherein said top has a recessed cavity at its center that has a predetermined vertical cavity depth and extends over a predetermined, horizontal, cavity floor area, and a stand rotatably secured to said bottom of said box by a mounting between said stand and said bottom of said box that permits rotation of said box relative to said stand about a vertical axis of rotation passing through the center of said box, the center of said recessed cavity, and the center of said stand, and said stand covers a stand base area that fits snugly within said cavity floor area and said stand supports said box thereabove at a height at least as great as said predetermined vertical cavity depth, and said top is formed as a removable lid that seats atop said upright walls.

3. A plurality of modular storage units each comprising: a box having upright walls arranged symmetrically about a vertical axis of rotation, a horizontal top extending across the upper extremities of said upright walls, and a horizontal bottom extending across the lower extremities of said upright walls, and wherein a shallow, concave upwardly facing stand cavity is defined at the center of said top and said stand cavity has a predetermined cavity depth shallower than the thickness of said top and covers a stand cavity surface area that is centered on said vertical axis of rotation, and a stand located beneath the center of said box bottom and covering a horizontal stand area that conforms to and fits closely within said stand cavity surface area, and said stand supports said box for rotation about its vertical axis at a height that exceeds said predetermined cavity depth, and said boxes are vertically stacked one atop another so that their axes of rotation coincide, and with said cavity of all but the uppermost box receiving and laterally confining the stand of a box located above it, and wherein said tops of said boxes are removable from said upright walls.

4. A modular storage unit comprising a box having three upright, rectangular side walls that define an interior enclosure and a completely open rectangular side located between two of said side walls and opposite the other to provide access to said interior enclosure, and at least one of said upright side walls is formed as a frame and has a window opening defined therein and a picture removably mounted on the inside of said frame for viewing through said window opening, wherein said side walls and said completely open side together define a vertical axis of rotation a their center, a horizontal, rectangular top closing the upper extremities of said side walls, wherein said top defines on its upper surface a concave, upwardly facing recess having a stand-confining horizontal surface area centered on said vertical axis, a horizontal, rectangular bottom closing the lower extremities of said side walls, and a stand located beneath and supporting said bottom for rotation relative to said stand about said vertical axis, and said stand covers a round, horizontal stand base area the conforms to and fits snugly within said stand-confining horizontal surface area.

* * * * *